United States Patent [19]

Baccei

[11] 4,451,975

[45] Jun. 5, 1984

[54] CONTACT MOUNTING PRESS

[75] Inventor: James S. C. Baccei, Terryville, Conn.

[73] Assignee: Litton Systems, Inc., Watertown, Conn.

[21] Appl. No.: 387,949

[22] Filed: Jun. 14, 1982

[51] Int. Cl.³ .......... B23P 19/00

[52] U.S. Cl. .......... 29/705; 29/739; 29/747; 29/760

[58] Field of Search .......... 29/739, 741, 747, 760, 29/837–839, 705

[56] References Cited

U.S. PATENT DOCUMENTS

| | | | |
|---|---|---|---|
| 3,769,679 | 11/1973 | Kendall | 29/739 |
| 3,875,636 | 4/1975 | Shultz, Jr. et al. | 29/741 |
| 4,270,267 | 6/1981 | Bakermans | 29/739 |
| 4,315,365 | 2/1982 | Wigby | 29/739 |
| 4,316,321 | 2/1982 | Wickham | 29/739 |
| 4,333,233 | 6/1982 | Dodson et al. | 29/739 |

*Primary Examiner*—Howard N. Goldberg

*Assistant Examiner*—P. W. Echols

*Attorney, Agent, or Firm*—Brian L. Ribando

[57] ABSTRACT

A contact mounting press for mating press fit electrical contacts with plated-through apertures in an electrical circuit board comprises a vertically displaceable press head which forcefully displaces the contacts into the plated-through apertures. The press head includes a device for gripping the contacts and a contact locator including a locating tool having a plurality of notches, and a wire which opposes the tool. The locating tool and the wire are brought together to positively locate each contact within one of the notches and the press head with the contact locator means are lowered in a rigid single motion to insert the ends of the contacts into the circuit board apertures. A control device separates the locating tool and the wire to disengage the contacts after the ends of the contacts have been inserted into the circuit board apertures, and further downward motion of the press head forcefully displaces the contacts into the circuit board to achieve a press fit.

3 Claims, 11 Drawing Figures

CONTACT MOUNTING PRESS

BACKGROUND OF THE INVENTION

The invention relates to an arbor press for inserting and pressing a plurality of electrical contacts into a printed circuit board in a single press stroke.

Due to the delicate construction of the contacts, it is the practice in the industry to manually locate contact ends in printed circuit board apertures and then with special tools or arbor presses press fit them singly or in strip arrays into the plated-through openings. The depth of pentration is operator controlled and thus subject to variance. There is therefore a need for an arbor press which can precisely locate contact ends to permit machine insertion and pressing into a circuit board and which provides for sensing variations in the thickness of the printed circuit board and automatically adjusts the length of the press stroke to effect the proper depth of contact penetration into the board.

SUMMARY AND OBJECTS OF THE INVENTION

A contact mounting press is comprised of a mechanism for holding a plurality of electrical contacts in an array, precisely locating the contact ends to allow machine insertion into circuit board apertures and accomplishing a press fit without abrasive damage to the contacts. The contact mounting press is further comprised of a means for sensing circuit board thicknesses and controlling therefrom the depth of contact insertion.

It is therefore an object of the invention to provide a contact mounting press.

It is further an object of the invention to provide a press which has a means for precisely locating the electrical contact ends relative to the circuit board apertures.

It is also an object of the invention to provide a press which can accomplish a forceful insertion of the contacts into the circuit board.

It is further an object of the invention to provide a press which performs the alignment and insertion process without abrasive or other damage to either the contact or its plating.

It is further an object of the invention to provide a press onto which contacts in strip arrays can be easily loaded and held for precise insertion.

It is further an object of the invention to provide a press which can sense circuit board thickness and generate a control signal therefrom.

It is further an object of the invention to provide a press whose length of stroke can be controlled to accommodate variations in circuit board thickness.

DESCRIPTION OF THE PREFERRED EMBODIMENT

Figure 1:
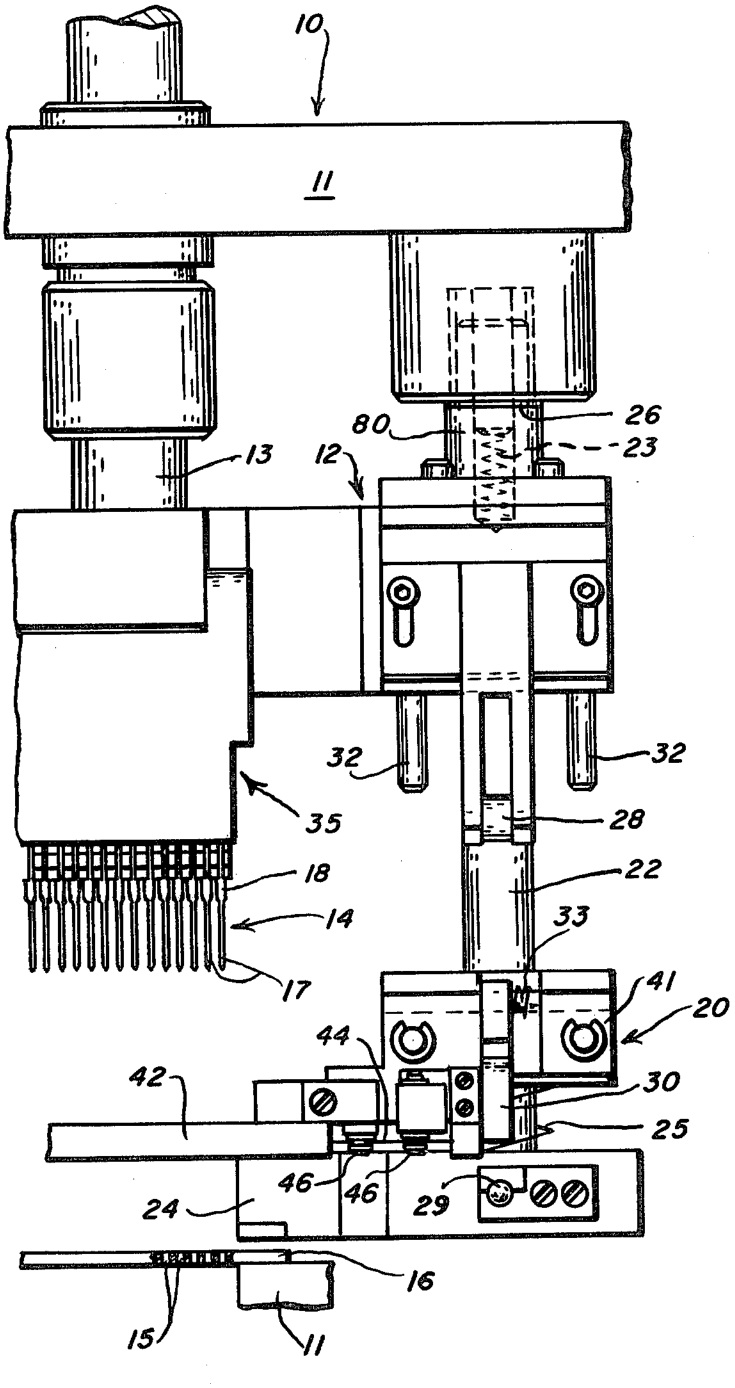
FIGS. 1 and 1A are an outline and partial section of one end of the contact mounting press in accordance with the invention with the press in an at rest position.
Figure 1A:
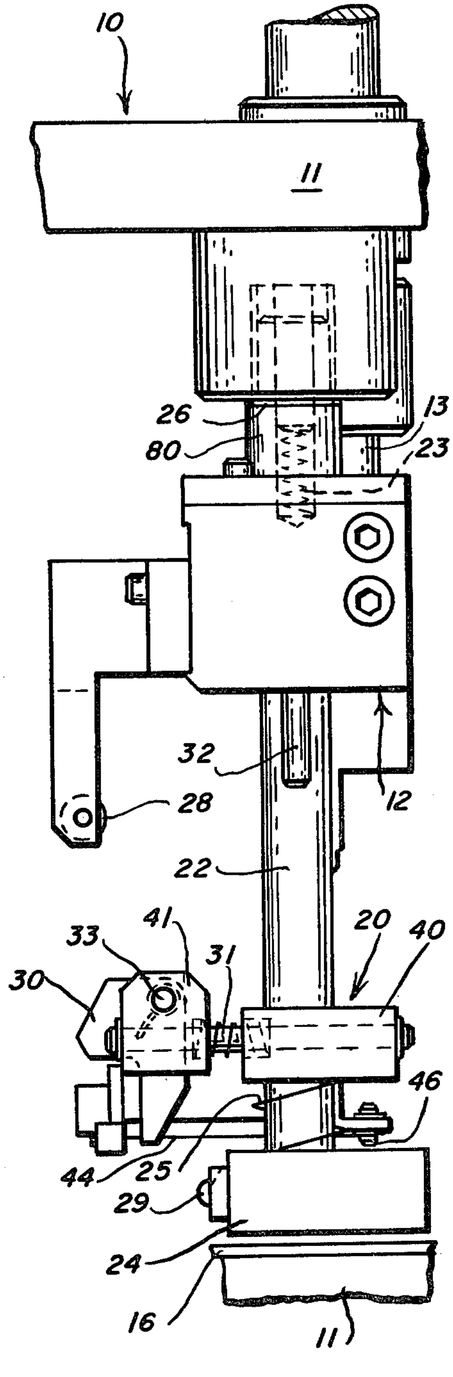

The contact mounting press 10 shown in FIG. 1 and 1A in an at rest condition generally includes a fixed frame 11 to which is attached through actuator rod 13 a movable press head 12. A clamping fixture 35 is connected to the movable press head 12 and holds an array of contacts 14 for insertion into the apertures 15 of a circuit board 16.

In the position shown, guide rod 22 which passes through the ends of the movable press head 12 is held in a raised position by a collar 80 on the press head which contacts and lifts a retaining ring 26 attached to each guide rod 22. As the actuator rod 13 lowers the movable press head 12, the guide rod 22 drops until a sensor arm 24, attached to the end of the guide rod 22, contacts the circuit board 16. A compression spring 23 acts through the guide rod 22 and the sensor arm 24 to clamp the circuit board to the frame 11 and establish a fixed relationship between the position of the guide rod 22 and the frame 11. This relationship is converted to a control signal by a transducer (not shown) which is a function of the thickness of the circuit board 16 and which is used to control the length of stroke of the press head 12, and thus control the depth of insertion of the contacts 14 into the board 16.

Figure 2:
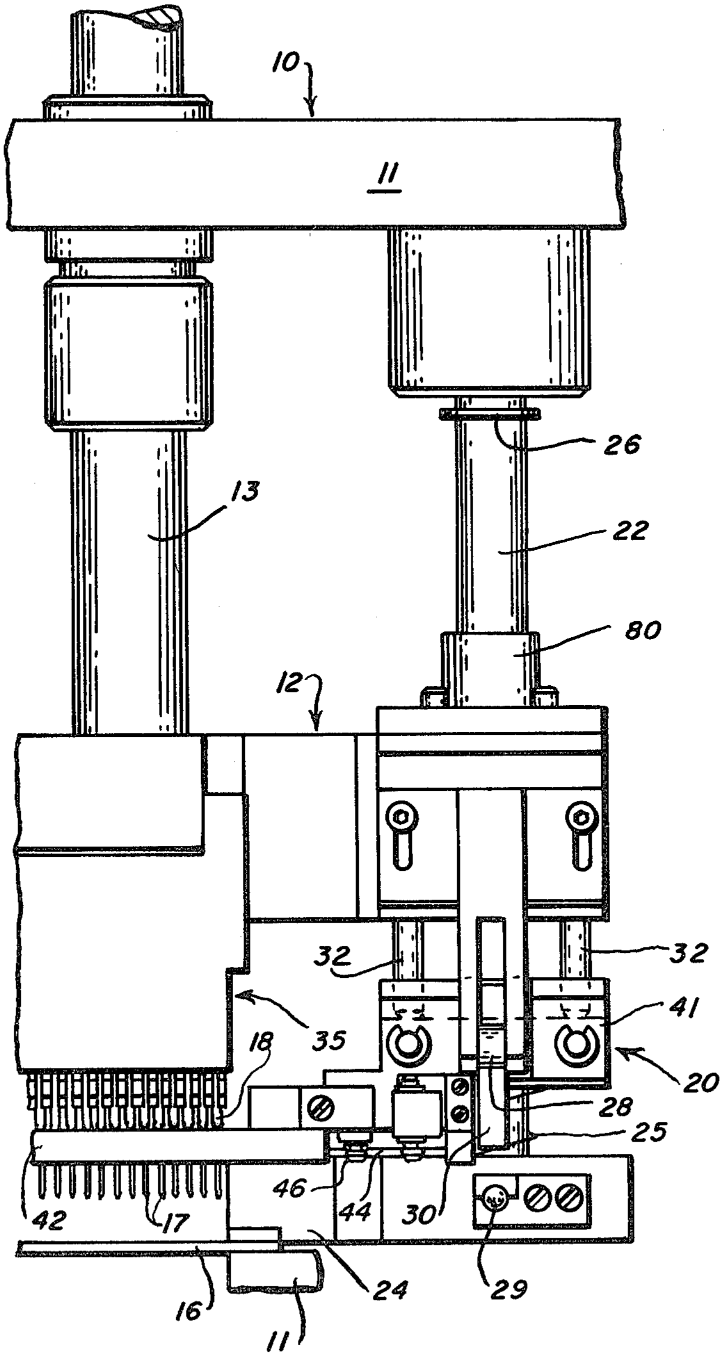
FIGS. 2, 2A and 2B are views of an intermediate position on the downstroke of the press shown in FIGS. 1 and 1A.
Figure 2A:
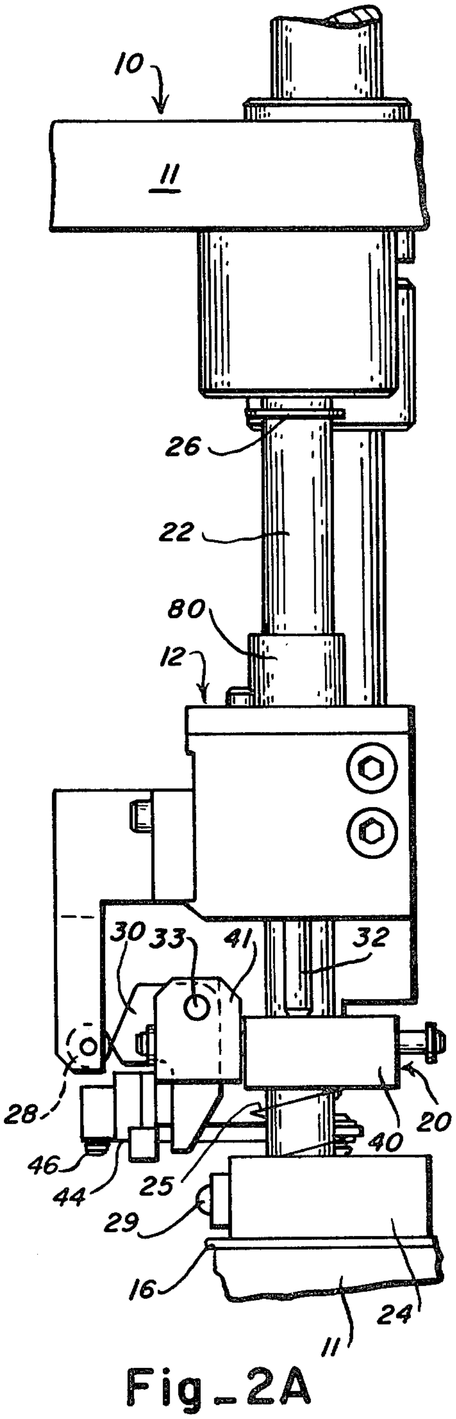

FIGS. 2 and 2A show the sensor arm 24 contacting the circuit board 16 and the contacts 14 adjacent to a locator assembly 20. The locator assembly is maintained a fixed distance above the sensor arm 24 and the circuit board 16 by a compression spring 25 to maintain a fixed relationship between the locator comb 42 and the top of the circuit board 16 during that portion of the downstroke when the locator comb 42 and the locator wire first engage the contacts.

Figure 2B:
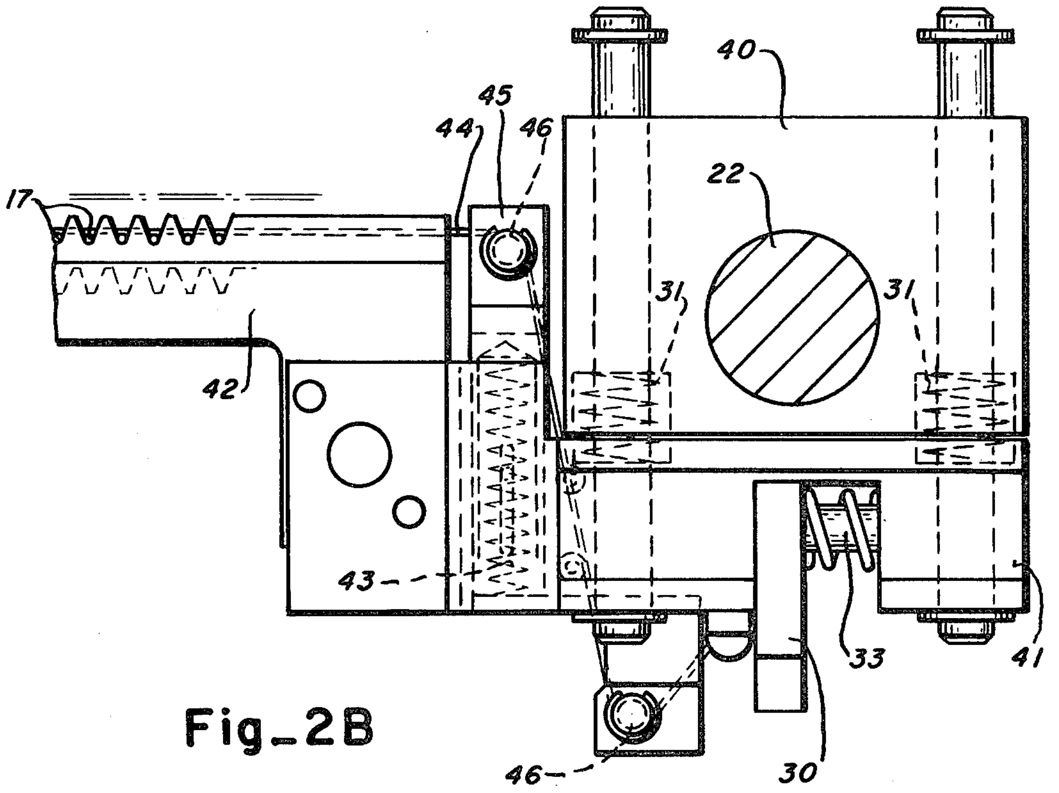
Figure 5:
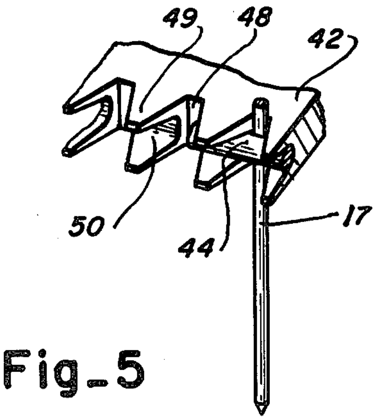
FIG. 5 is a perspective view of the bifurcated notches of the locator comb.

As best seen in FIG. 2B, the locator assembly 20 comprises a locator comb 42, a locator wire 44, support block 40, end bracket 41, actuating pawl 30 and associated interconnecting linkages. In the lowered position shown (with reference again to FIGS. 2 and 2A), the press head 12 through the roller 28 laterally displaces the actuating pawl 30 to translate the locator comb 42 toward and into contact or proximate contact with the contacts 14. This same translation motion of the locator comb 42 and the end bracket 41 to which it is attached draws the locator wire 44 toward the locator comb 42 causing it to enter the bifurcations 50 of the locator comb teeth 49 shown in FIG. 5 accurately locating and firmly gripping the tails 17 of the contacts 14 in the notches 48. The locator wire 44 is drawn toward the locator comb 42 as the end bracket 41 to which it is affixed moves relative to support blocks 40 and draws the wire through sheaves 46 compressing the biasing springs 43 of the struts 45.

Figure 3:
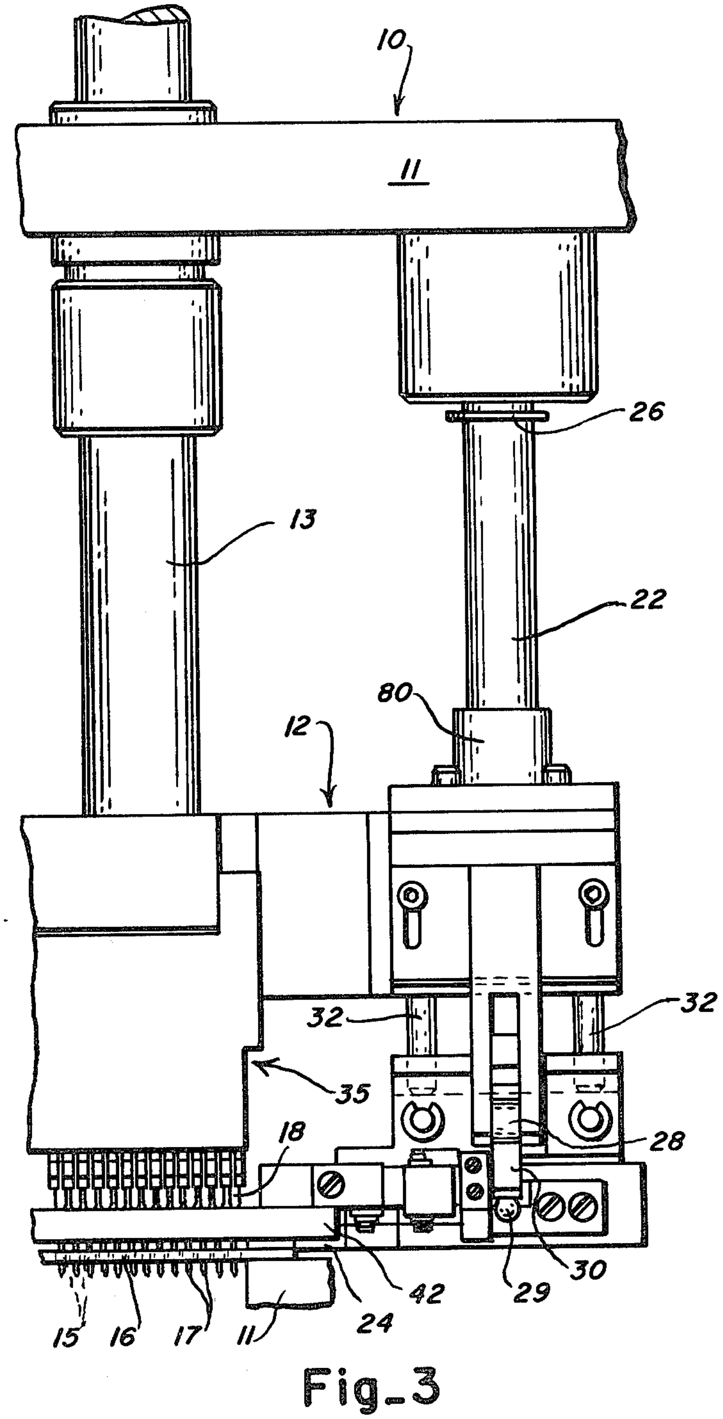
FIGS. 3 and 3A are views of yet another intermediate downstroke position of the press shown in FIGS. 1 and 1A.
Figure 3A:
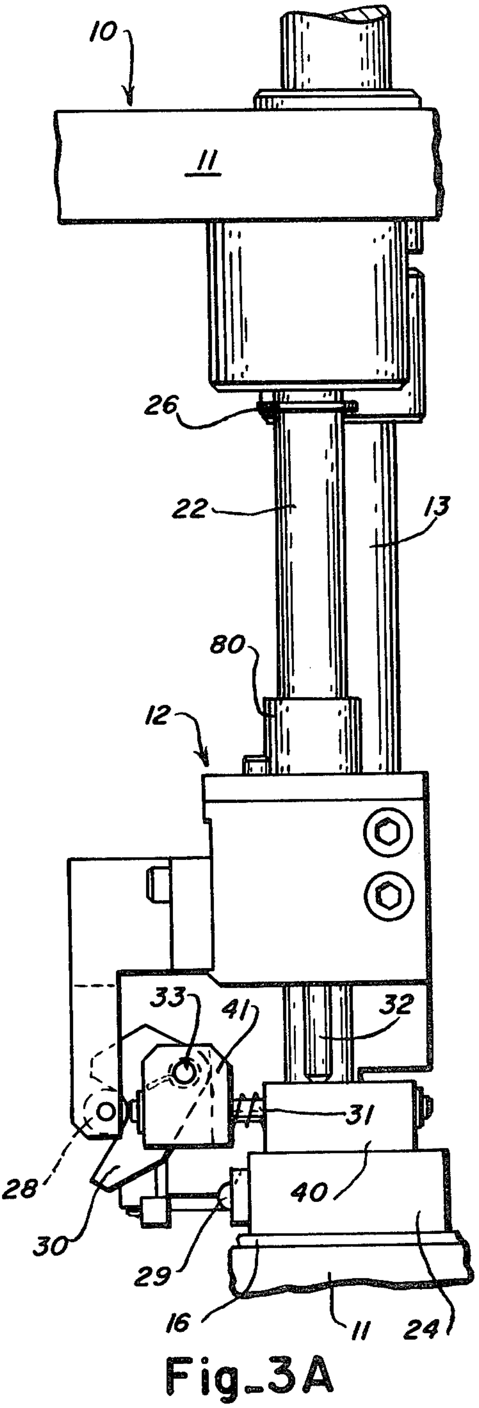

FIGS. 3 and 3A show the contact tails 17 inserted into the apertures 15 of the circuit board 16 as a result of the press head 12 and the locator assembly 20 continuing a downward stroke as a rigid unit as the head 12 acts through the spring loaded plunger 32 to lower the locator assembly 20 against the support of the compressing spring 25. With the press head 12 and the locator assembly 20 operating as a rigid unit, there is no relative motion between the contacts 14 and the elements of the locator assembly 20 which precludes abrasive damage to the contacts or any plating thereon. Immediately before the support block 40 contacts the sensor arm 24, a pawl assist pin 29 acts on the pawl 30 to abruptly rotate the same out of engagement with the roller 28. This allows the actuating pawl 30 to retract, motivated by the pawl return spring 31, and the locator comb 42 and wire 44 to separate, releasing the contact tails 17.

Figure 4:
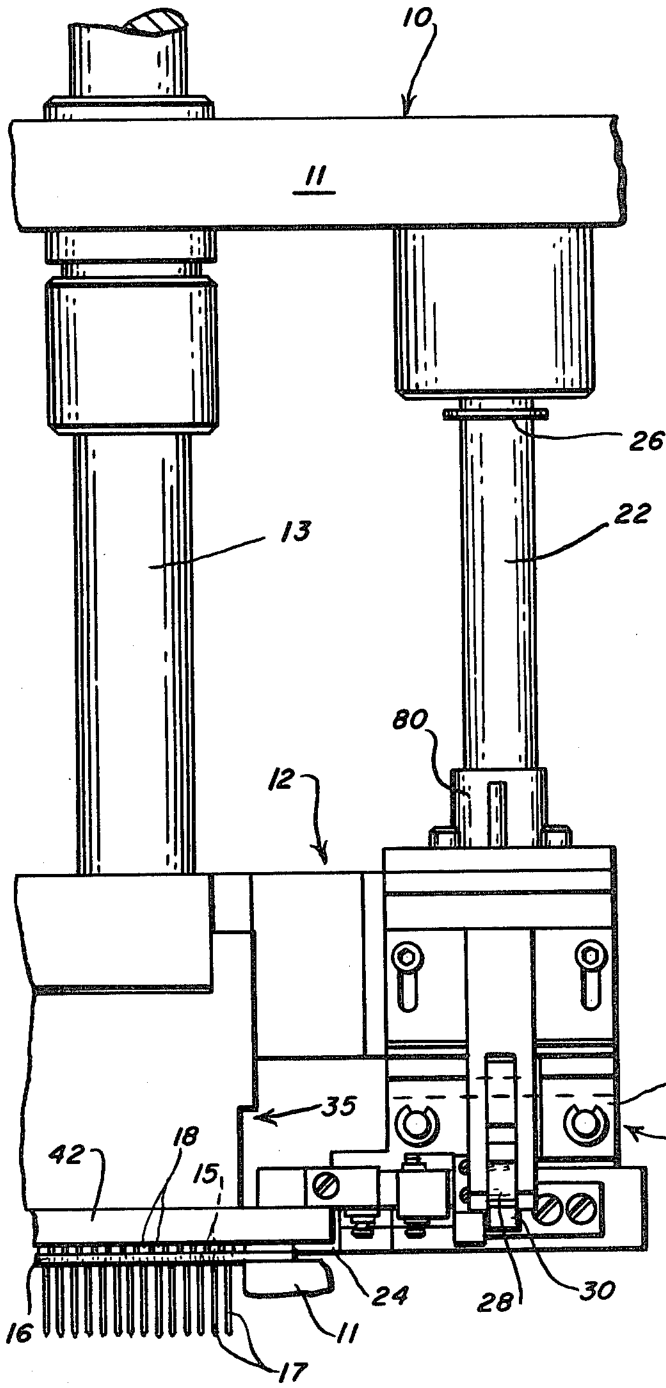
FIGS. 4 and 4A are views of the press shown in FIGS. 1 and 1A in a fully closed position.
Figure 4A:
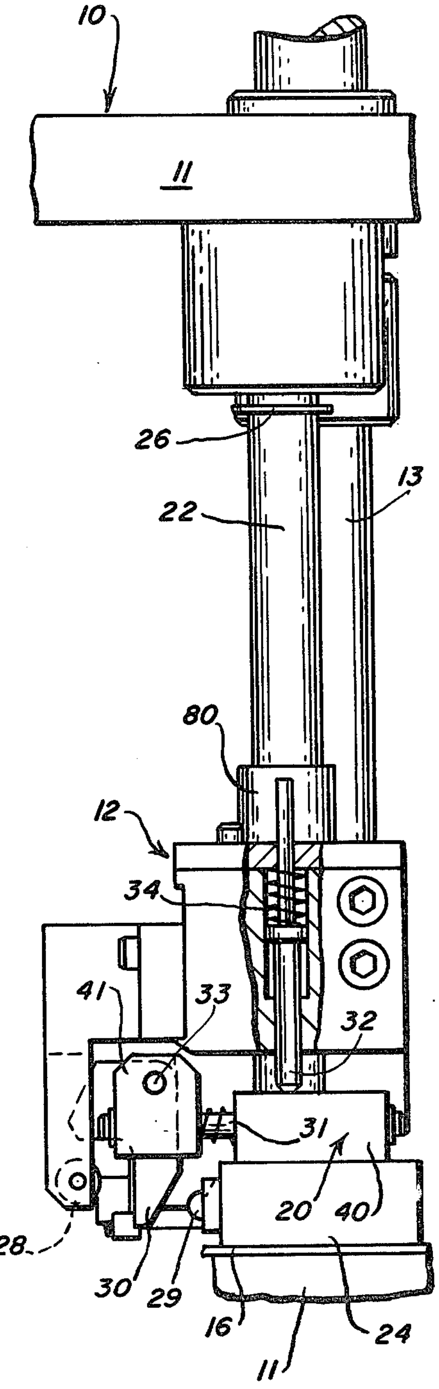

As the head continues its downstroke, as shown in FIGS. 4 and 4A, the plungers 32 retract into the press head 12 against the biasing springs 34. The contacts, now free to move relative to the locator assembly 20 without abrasion, are forcefully pressed into the circuit board engaging the contact press fit section 18 into the apertures 15.

The press head initiates an upstroke and the upper portion of the terminals 14 are withdrawn from the clamping fixture 35. As the roller 28 engages the actuating pawl 30 in the upstroke, the pawl 30 rotates about a pivot 33 to avoid reengagement of the locator comb 42 and locator wire 44 with the contacts 14 thus obviating damage to the upper portion of the contacts which are now tightly press fit in the circuit board 16.

Figure 6:
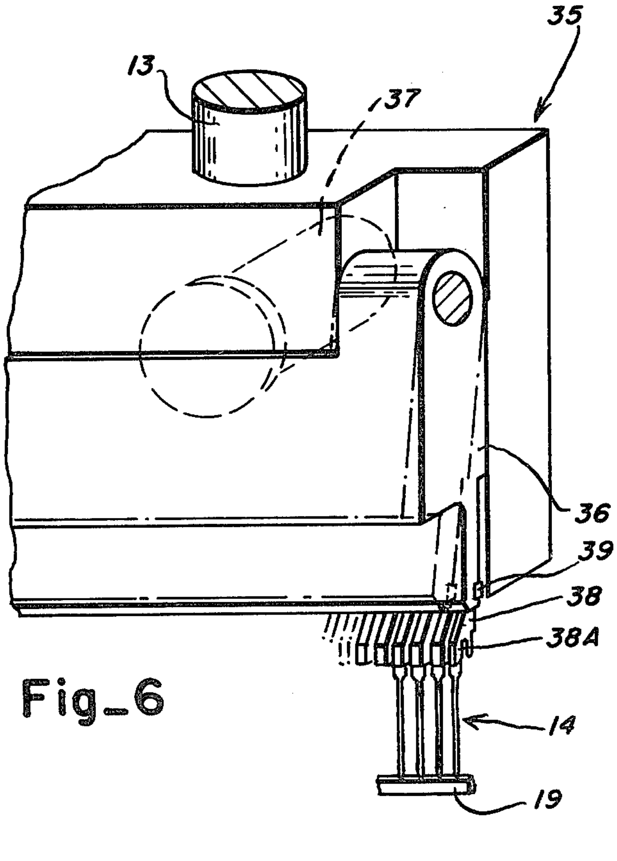
FIG. 6 is a view of the clamping fixture.

The clamping fixture 35, shown in FIG. 6, comprises a front swing clamp 36 which is caused to rotate through a limited angle by an actuator 37. The contacts 14, joined in an array by carrier strip 19, are loaded into the rear comb clamp 38, held separated by comb clamp teeth 38*a* preliminarily aligned with the circuit board apertures and held secure by a flexible strip 39 as the swing clamp 36 is closed by the actuator 37. After the swing clamp is closed, the carrier strip is removed by the machine operator. The press head 12 then initiates a downstroke and opens, releasing the contacts 14, at initiation of an upstroke.

Having thus described the invention, various alterations and modifications will occur to those skilled in the art, which alterations and modifications are intended to be within the scope of the invention as defined by the appended claims.

What is claimed is:

1. A contact mounting press for mating a plurality of press fit electrical contacts with a plurality of plated-through apertures in an electrical circuit board, the press comprising:
   - a vertically displaceable press head means for forcefully displacing said contacts into said plated-through apertures, said press head including means for gripping said contacts,
   - a contact locating means including:
     - a locating tool having a plurality of notches, each for engaging one of the contacts held by said press head to precisely align the contact with the circuit board aperture,
     - a wire means opposing said tool,
   - means for positioning the contacts between said locating tool and the opposing wire means,
   - means for advancing said locating tool and said wire means to positively locate each contact within one of said notches,
   - means for lowering said press head and said contact locating means in a rigid single motion to insert the ends of said contacts into the circuit board apertures,
   - means for retracting said locating tool and said wire means to disengage the contacts after the ends of said contacts have been inserted into the circuit board apertures,
   - means to forcefully displace said contacts further into the circuit board and achieving a press fit.

2. A contact mounting press according to claim 1 including:
   - a means to sense the circuit board thickness,
   - a means to control the length of press head stroke as a function of the circuit board thickness.

3. A contact mounting press according to claim 1 wherein the contact gripping means comprises:
   - a comb clamp and comb clamp teeth for preliminarily aligning said contacts with the circuit board apertures, and
   - a flexible constraint allowing the contact locating means to precisely align each contact with a selected circuit board aperture.

* * * * *